US012571748B2

(12) United States Patent
Wang et al.

(10) Patent No.: US 12,571,748 B2
(45) Date of Patent: Mar. 10, 2026

(54) SYSTEM AND METHOD FOR DETERMINING LOCAL FOCUS POINTS DURING INSPECTION IN A CHARGED PARTICLE SYSTEM

(71) Applicant: ASML Netherlands B.V., Veldhoven (NL)

(72) Inventors: Te-Sheng Wang, San Jose, CA (US);
Szu-Po Wang, Kaohsiung (TW);
Tsung-Hsien Liu, Taipei (TW);
Yung-Huan Hsieh, Santa Clara, CA (US)

(73) Assignee: ASML Netherlands B.V., Veldhoven (NL)

( * ) Notice: Subject to any disclaimer, the term of this patent is extended or adjusted under 35 U.S.C. 154(b) by 349 days.

(21) Appl. No.: 18/284,824

(22) PCT Filed: Mar. 4, 2022

(86) PCT No.: PCT/EP2022/055553
§ 371 (c)(1),
(2) Date: Sep. 28, 2023

(87) PCT Pub. No.: WO2022/207236
PCT Pub. Date: Oct. 6, 2022

(65) Prior Publication Data
US 2024/0183806 A1      Jun. 6, 2024

Related U.S. Application Data

(60) Provisional application No. 63/168,197, filed on Mar. 30, 2021.

(51) Int. Cl.
*G01N 23/2251* (2018.01)

(52) U.S. Cl.
CPC ... *G01N 23/2251* (2013.01); *G01N 2223/305* (2013.01); *G01N 2223/6116* (2013.01)

(58) Field of Classification Search
CPC ......... G01N 23/2251; G01N 2223/305; G01N 2223/6116; H01J 2237/21; H01J 2237/22;
(Continued)

(56) References Cited

U.S. PATENT DOCUMENTS

| | | | |
|---|---|---|---|
| 2005/0194533 A1* | 9/2005 | Okuda | H01J 37/28 |
| | | | 250/307 |
| 2007/0048635 A1 | 3/2007 | Schulze et al. | |

(Continued)

FOREIGN PATENT DOCUMENTS

| | | |
|---|---|---|
| TW | 202107198 A | 2/2021 |
| TW | 202107226 A | 2/2021 |

(Continued)

OTHER PUBLICATIONS

Valdecasas, Antonio G. et al., "Extended Depth-of-Focus Algorithms in Brightfield Microscopy," Microscopy and Analysis, No. 91, Sep. 1, 2002, pp. 9-12, XP055665535 (3 pgs.).

(Continued)

*Primary Examiner* — Jason L McCormack
(74) *Attorney, Agent, or Firm* — Finnegan, Henderson, Farabow, Garrett & Dunner LLP

(57) ABSTRACT

Apparatuses, systems, and methods for determining local focus points (LFPs) on a sample are provided. In some embodiments, a controller including circuitry may be configured to cause a system to perform selecting a first plurality of resist pattern designs; performing a plurality of process simulations using the first plurality of resist pattern designs; identifying a hotspot that corresponds to a resist pattern design based on results of the performed process simulations; determining focus-related characteristics that corre- (Continued)

spond to a plurality of candidate resist patterns, wherein the plurality of candidate resist pattern designs is a subset of the first plurality of resist pattern designs and the subset is selected based on the identified hotspot; and determining locations of a plurality of LFPs based on the generated focus-related characteristics.

20 Claims, 7 Drawing Sheets

(58) Field of Classification Search
CPC .. H01J 37/00; H01J 37/02; H01J 37/21; H01J 37/22; H01J 37/222; H01J 37/26; H01J 37/265; H01J 37/28
USPC .......................................... 250/306, 307, 311
See application file for complete search history.

(56) References Cited

U.S. PATENT DOCUMENTS

| | | | |
|---|---|---|---|
| 2009/0001279 A1* | 1/2009 | Kobaru | H01J 37/28 |
| | | | 250/396 R |
| 2013/0176558 A1* | 7/2013 | Lin | G03F 9/7034 |
| | | | 356/237.5 |
| 2016/0189368 A1 | 6/2016 | Shindo | |
| 2018/0356734 A1 | 12/2018 | Conley et al. | |
| 2020/0089130 A1 | 3/2020 | Chao | |
| 2021/0166911 A1* | 6/2021 | Matsumoto | H01J 37/21 |

FOREIGN PATENT DOCUMENTS

| | | | |
|---|---|---|---|
| WO | WO 2019/010325 A1 | 1/2019 |
| WO | WO 2019/162346 A1 | 8/2019 |
| WO | WO 2020/193095 A1 | 10/2020 |

OTHER PUBLICATIONS

Hahlweg, Cornelius et al., "Utilization of the Scheimpflug-principle in scatterometer design," Helmut Schmidt University, University of the Federal Armed Forces, Holstenhofweg 85, D-22043 Hamburg, Germany (11 pgs.).

Terclavers, Sven, "Focus Strategies with ZEN2," XP055642866, ZEISS Embedded 3D Imaging Specialist, Harvard University, Jun. 13, 2018, Retrieved from the Internet: https://www.hcbi.fas.harvard.edu/files/hcb idoug/files/lunchlearn_-_focus_strategies_in_zen2.pdf, Aug. 13, 2018, retrieved on Nov. 15, 2019 (30 pgs.).

Hunsche, Stefan et al., "A new paradigm for in-line detection and control of patterning defects," Proceedings of SPIE, Event: SPIE Advanced Lithography, 2015, San Jose, California, United States, Downloaded From: https://www.spiedigitallibrary.org/conference-proceedings-of-spie on Aug. 30, 2023 (13 pgs.).

Office Action issued by the Taiwanese Patent Office in related Foreign Application No. TW 111109329, issued Mar. 13, 2023 (10 pgs.).

International Search Report issued in related Foreign Application No. PCT/EP2022/055553, mailed Jul. 5, 2022 (3 pgs.).

* cited by examiner

<u>700</u>

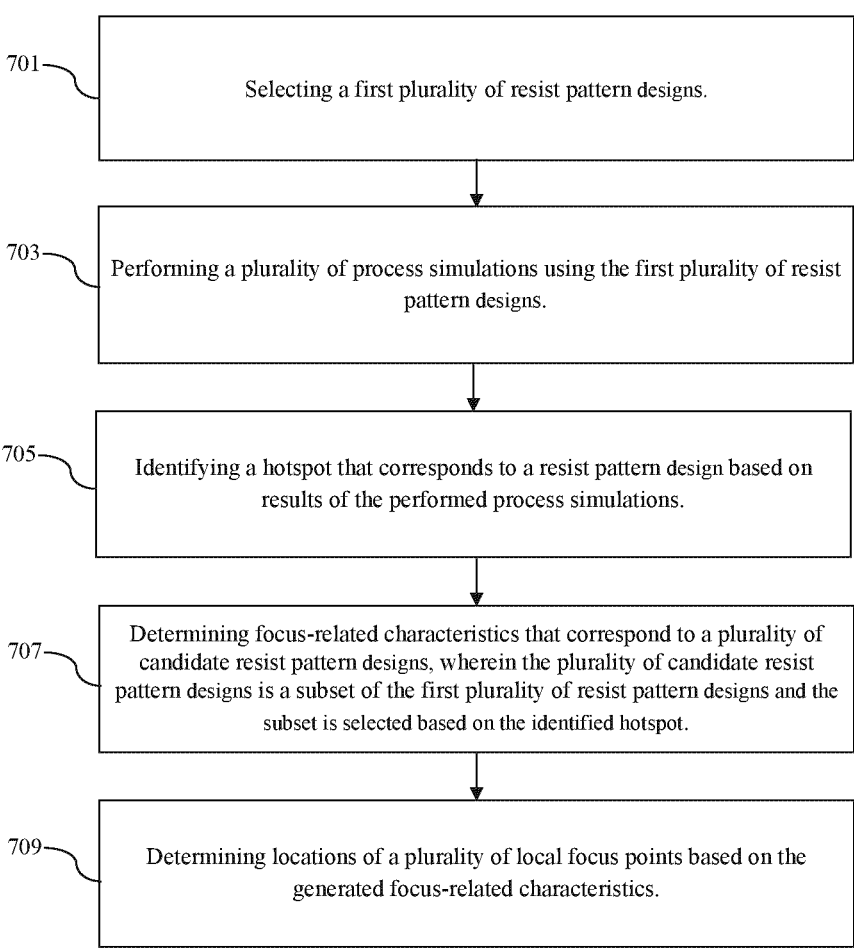

701 — Selecting a first plurality of resist pattern designs.

703 — Performing a plurality of process simulations using the first plurality of resist pattern designs.

705 — Identifying a hotspot that corresponds to a resist pattern design based on results of the performed process simulations.

707 — Determining focus-related characteristics that correspond to a plurality of candidate resist pattern designs, wherein the plurality of candidate resist pattern designs is a subset of the first plurality of resist pattern designs and the subset is selected based on the identified hotspot.

709 — Determining locations of a plurality of local focus points based on the generated focus-related characteristics.

FIG. 7

SYSTEM AND METHOD FOR DETERMINING LOCAL FOCUS POINTS DURING INSPECTION IN A CHARGED PARTICLE SYSTEM

CROSS-REFERENCE TO RELATED APPLICATIONS

This application claims priority to International Application No. PCT/EP2022/055553, filed Mar. 4, 2022, and published as WO 2022/207236 A1, which claims priority of U.S. application 63/168,197 which was filed on Mar. 30, 2021. The contents of these applications are incorporated herein by reference in their entireties.

FIELD

The description herein relates to the field of charged particle beam systems, and more particularly to systems for determining local focus points on a sample during inspection in charged particle beam system inspection systems.

BACKGROUND

In manufacturing processes of integrated circuits (ICs), unfinished or finished circuit components are inspected to ensure that they are manufactured according to design and are free of defects. An inspection system utilizing an optical microscope typically has resolution down to a few hundred nanometers; and the resolution is limited by the wavelength of light. As the physical sizes of IC components continue to reduce down to sub-100 or even sub-10 nanometers, inspection systems capable of higher resolution than those utilizing optical microscopes are needed.

A charged particle (e.g., electron) beam microscope, such as a scanning electron microscope (SEM) or a transmission electron microscope (TEM), capable of resolution down to less than a nanometer, serves as a practicable tool for inspecting IC components having a feature size that is sub-100 nanometers. With a SEM, electrons of a single primary electron beam, or electrons of a plurality of primary electron beams, can be focused at locations of interest of a wafer under inspection. The primary electrons interact with the wafer and may be backscattered or may cause the wafer to emit secondary electrons. The intensity of the electron beams comprising the backscattered electrons and the secondary electrons may vary based on the properties of the internal and external structures of the wafer, and thereby may indicate whether the wafer has defects.

SUMMARY

Embodiments of the present disclosure provide apparatuses, systems, and methods for determining local focus points (LFPs) on a sample. In some embodiments, a controller including circuitry configured to cause the system to perform selecting a first plurality of resist pattern designs; performing a plurality of process simulations using the first plurality of resist pattern designs; identifying a hotspot that corresponds to a resist pattern design based on results of the performed process simulations; determining focus-related characteristics that correspond to a plurality of candidate resist pattern designs, wherein the plurality of candidate resist pattern designs is a subset of the first plurality of resist pattern designs and subset is selected based on the identified hotspot; and determining locations of a plurality of LFPs based on the generated focus-related characteristics.

In some embodiments, a method for determining LFPs on a sample may include selecting a first plurality of resist pattern designs; performing a plurality of process simulations using the first plurality of resist pattern designs; identifying a hotspot in a resist pattern design based on results of the performed process simulations; determining focus-related characteristics for a plurality of candidate resist pattern designs, wherein the plurality of candidate resist pattern designs is a subset of the first plurality of resist pattern designs and the subset is selected based on the identified hotspot; and determining locations of a plurality of LFPs based on the generated focus-related characteristics.

In some embodiments, a non-transitory computer readable medium may store a set of instructions that is executable by at least one processor of a computing device to cause the computing device to perform a method for determining LFPs on a sample. The method may include selecting a first plurality of resist pattern designs; performing a plurality of process simulations using the first plurality of resist pattern designs; identifying a hotspot in a resist pattern design based on results of the performed process simulations; determining focus-related characteristics for a plurality of candidate resist pattern designs, wherein the plurality of candidate resist pattern designs is a subset of the first plurality of resist pattern designs and the subset is selected based on the identified hotspot; and determining locations of a plurality of LFPs based on the generated focus-related characteristics.

BRIEF DESCRIPTION OF THE DRAWINGS

FIG. 7 is a flowchart illustrating an exemplary process of determining LFPs on a sample, consistent with embodiments of the present disclosure.

DETAILED DESCRIPTION

Figure 1:
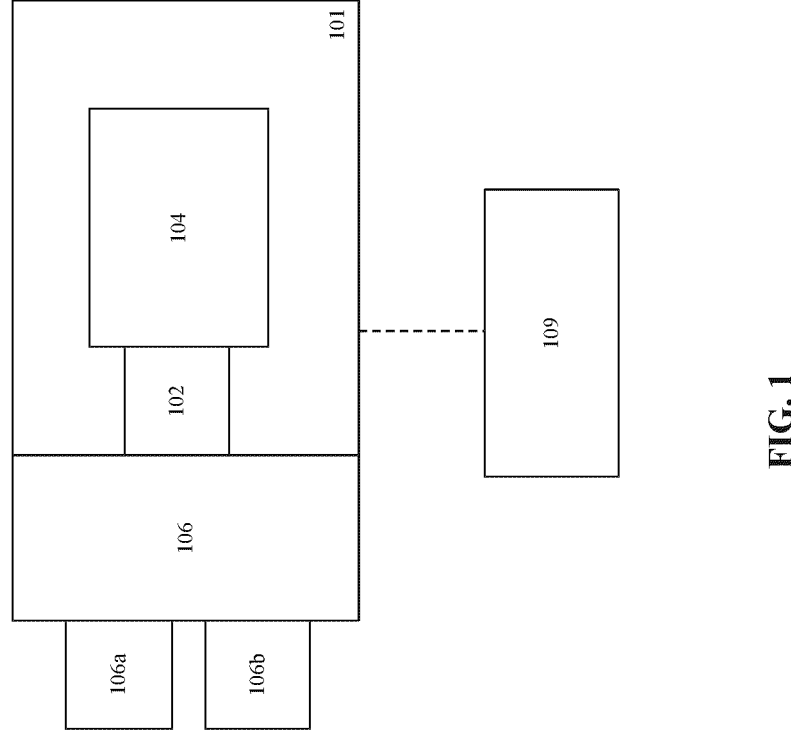
FIG. 1 is a schematic diagram illustrating an exemplary electron beam inspection (EBI) system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims. For example, although some embodiments are described in the context of utilizing electron beams, the disclosure is not so limited. Other types of charged particle beams may be similarly applied. Furthermore, other imaging systems may be used, such as optical imaging, photodetection, x-ray detection, extreme ultraviolet inspection, deep ultraviolet inspection, or the like.

Electronic devices are constructed of circuits formed on a piece of silicon called a substrate. Many circuits may be formed together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than $\frac{1}{1000}$th the size of a human hair.

Making these extremely small ICs is a complex, time-consuming, and expensive process, often involving hundreds of individual steps. Errors in even one step have the potential to result in defects in the finished IC rendering it useless. Thus, one goal of the manufacturing process is to avoid such defects to maximize the number of functional ICs made in the process, that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection may be carried out using a scanning electron microscope (SEM). A SEM can be used to image these extremely small structures, in effect, taking a "picture" of the structures of the wafer. The image can be used to determine if the structure was formed properly and also if it was formed at the proper location. If the structure is defective, then the process can be adjusted so the defect is less likely to recur. Defects may be generated during various stages of semiconductor processing. For the reason stated above, it is important to find defects accurately and efficiently as early as possible.

The working principle of a SEM is similar to a camera. A camera takes a picture by receiving and recording brightness and colors of light reflected or emitted from people or objects. A SEM takes a "picture" by receiving and recording energies or quantities of electrons reflected or emitted from the structures. Before taking such a "picture," an electron beam may be provided onto the structures, and when the electrons are reflected or emitted ("exiting") from the structures, a detector of the SEM may receive and record the energies or quantities of those electrons to generate an image. To take such a "picture," some SEMs use a single electron beam (referred to as a "single-beam SEM"), while some SEMs use multiple electron beams (referred to as a "multi-beam SEM") to take multiple "pictures" of the wafer. By using multiple electron beams, the SEM may provide more electron beams onto the structures for obtaining these multiple "pictures," resulting in more electrons exiting from the structures. Accordingly, the detector may receive more exiting electrons simultaneously, and generate images of the structures of the wafer with a higher efficiency and a faster speed.

During inspection, it is advantageous to generate SEM images having higher resolutions so that the features (e.g., a contact, a metal line, a gate, etc.) on a sample in the SEM images accurately represent the actual sample. In order to generate higher resolution SEM images, images of the features on the sample need to be in focus. To facilitate obtaining a high-quality focus, multiple points are chosen to use for focusing. These points are called Local Focus Points (LFPs). As a sample is being prepared for imaging, the SEM e-beam needs to be focused. In order to obtain sufficient focus across the sample, a number of LFPs on the wafer are located and the e-beam is focused at each of these LFPs, such as across the sample at the start of sample inspection, across a Field of View (FOV) in preparation for that FOV being scanned, etc.

An example of an issue in the focusing process is selecting LFPs that enable sufficient focusing to occur. Selection of a poor focus point may result in any of a number of potential issues, such as the focus point not having suitable features that enable sufficient focusing (e.g., the features at the LFP not having a suitable density, height, other characteristic, etc.), being susceptible to charging effects that negatively impact image quality, having a defect, being susceptible to damage from the e-beam, etc. Another example is that selecting LFPs manually is a time-consuming process.

In some cases, an LFP may be located near a sample feature, rather than at the feature, due to the effects of SEM inspection itself. SEM inspection involves bombarding a sample with electrons. Because a photoresist may be sensitive to electrons, a photoresist may shrink or compress a non-negligible amount as a result of SEM inspection. That is, SEM inspection may damage the photoresist on the sample, altering the pattern of the sample. This alteration may result in modified key performance indicators (e.g., defects, line-edge roughness, line-width roughness, local critical dimension uniformity, etc.) that are not reflective of the true key performance indicators of the sample when it has not been inspected by the SEM after development. Therefore, in order to avoid damaging sample features during inspection, LFPs may be located near, but not on, features on a sample.

LFPs are typically located on a sample by manually searching the sample for points on which to focus during inspection. In some cases, LFPs are fixed locations on a sample. However, these typical methods of determining LFPs suffer from constraints. For example, manually searching for LFPs on a sample is time-intensive because it requires many iterations of testing different points to determine whether the point is an adequate LFP. Even after many iterations, manually searching for LFPs may not result in determining the highest quality LFPs. Therefore, manually determined LFPs and fixed LFPs are not robust since they only encompass a limited number of locations on a sample that may not include points of interest during inspection.

Moreover, inspection can occur at a number of stages that vary for different samples. For example, images of a sample can be taken after a photoresist applied to the sample has been developed (e.g., after lithography), after etching, among other stages. Inspection of the sample after development may be desired since it provides a direct connection between SEM images obtained during inspection and the various exposure process conditions (e.g., focus, dose, etc.) that define the patterning performance. Inspection of the sample after development may allow the exposure process conditions to be optimized.

LFPs at fixed locations on a sample ("fixed LFPs") are undesirable because sample processing varies for different samples, meaning that for some samples the fixed LFPs may not be near any design targets or other points of interests. For example, a fixed LFP may be located on a hotspot (e.g., areas with a higher likelihood of having defects), thereby resulting in an inaccurate focus height adjustment for inspection. Hotspots are features or areas on a sample that are less stable during sample processing and, therefore, should be avoided as LFPs. For example, areas with a higher likelihood of having defects may be undesirable LFPs since defects may change the focusing characteristics of a location on a sample. In some embodiments, fixed LFPs may be undesirable since they may be aligned with a certain resist pattern design for a wafer design, but the sample under inspection may have a higher likelihood of having defects at the fixed LFPs. In these embodiments, fixed LFPs may be undesirable since defects may impact the alignment of the fixed LFPs. In some cases, fixed LFPs may result in damaging a design target.

Some of the disclosed embodiments provide systems and methods that address some or all of these disadvantages by determining robust, high-quality LFPs on a sample prior to or even during inspection. The disclosed embodiments may perform process simulations for a plurality of resist or other patterns to locate hotspots, determine focus-sensitive points on a sample, determine imaging characteristics of the points, etc. thereby enabling the location of robust, high-quality LFPs on the sample.

Relative dimensions of components in drawings may be exaggerated for clarity. Within the following description of drawings, the same or like reference numbers refer to the same or like components or entities, and only the differences with respect to the individual embodiments are described.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

FIG. 1 illustrates an exemplary electron beam inspection (EBI) system 100 consistent with embodiments of the present disclosure. EBI system 100 may be used for imaging. As shown in FIG. 1, EBI system 100 includes a main chamber 101, a load/lock chamber 102, an electron beam tool 104, and an equipment front end module (EFEM) 106. Electron beam tool 104 is located within main chamber 101. EFEM 106 includes a first loading port 106a and a second loading port 106b. EFEM 106 may include additional loading port(s). First loading port 106a and second loading port 106b receive wafer front opening unified pods (FOUPs) that contain wafers (e.g., semiconductor wafers or wafers made of other material(s)) or samples to be inspected (wafers and samples may be used interchangeably). A "lot" is a plurality of wafers that may be loaded for processing as a batch.

One or more robotic arms (not shown) in EFEM 106 may transport the wafers to load/lock chamber 102. Load/lock chamber 102 is connected to a load/lock vacuum pump system (not shown) which removes gas molecules in load/lock chamber 102 to reach a first pressure below the atmospheric pressure. After reaching the first pressure, one or more robotic arms (not shown) may transport the wafer from load/lock chamber 102 to main chamber 101. Main chamber 101 is connected to a main chamber vacuum pump system (not shown) which removes gas molecules in main chamber 101 to reach a second pressure below the first pressure. After reaching the second pressure, the wafer is subject to inspection by electron beam tool 104. Electron beam tool 104 may be a single-beam system or a multi-beam system.

A controller 109 is electronically connected to electron beam tool 104. Controller 109 may be a computer configured to execute various controls of EBI system 100. While controller 109 is shown in FIG. 1 as being outside of the structure that includes main chamber 101, load/lock chamber 102, and EFEM 106, it is appreciated that controller 109 may be a part of the structure.

In some embodiments, controller 109 may include one or more processors (not shown). A processor may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type circuit capable of data processing. The processor may also be a virtual processor that includes one or more processors distributed across multiple machines or devices coupled via a network.

In some embodiments, controller 109 may further include one or more memories (not shown). A memory may be a generic or specific electronic device capable of storing codes and data accessible by the processor (e.g., via a bus). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. The memory may also be a virtual memory that includes one or more memories distributed across multiple machines or devices coupled via a network.

Figure 2:
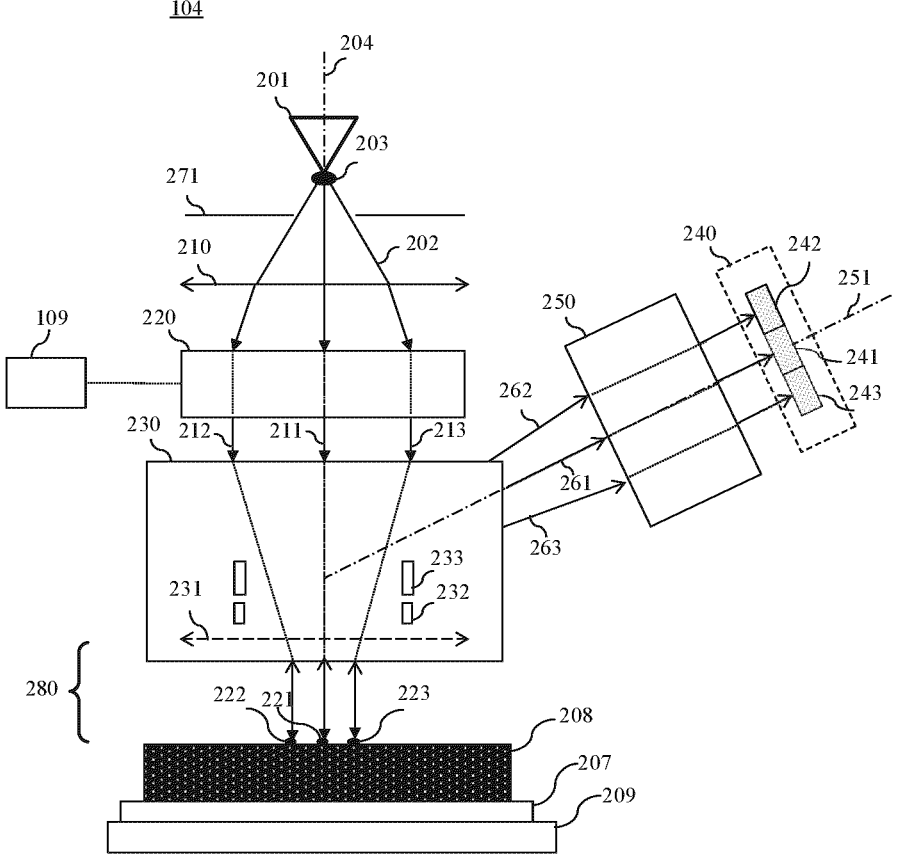
FIG. 2 is a schematic diagram illustrating an exemplary multi-beam system that is part of the exemplary charged particle beam inspection system of FIG. 1, consistent with embodiments of the present disclosure.

Reference is now made to FIG. 2, which is a schematic diagram illustrating an exemplary electron beam tool 104 including a multi-beam inspection tool that is part of the EBI system 100 of FIG. 1, consistent with embodiments of the present disclosure. In some embodiments, electron beam tool 104 may be operated as a single-beam inspection tool that is part of EBI system 100 of FIG. 1. Multi-beam electron beam tool 104 (also referred to herein as apparatus 104) comprises an electron source 201, a Coulomb aperture plate (or "gun aperture plate") 271, a condenser lens 210, a source conversion unit 220, a primary projection system 230, a motorized stage 209, and a sample holder 207 supported by motorized stage 209 to hold a sample 208 (e.g., a wafer or a photomask) to be inspected. Multi-beam electron beam tool 104 may further comprise a secondary projection system 250 and an electron detection device 240. Primary projection system 230 may comprise an objective lens 231. Electron detection device 240 may comprise a plurality of detection elements 241, 242, and 243. A beam separator 233 and a deflection scanning unit 232 may be positioned inside primary projection system 230.

Electron source 201, Coulomb aperture plate 271, condenser lens 210, source conversion unit 220, beam separator 233, deflection scanning unit 232, and primary projection system 230 may be aligned with a primary optical axis 204 of apparatus 104. Secondary projection system 250 and electron detection device 240 may be aligned with a secondary optical axis 251 of apparatus 104.

Electron source 201 may comprise a cathode (not shown) and an extractor or anode (not shown), in which, during operation, electron source 201 is configured to emit primary electrons from the cathode and the primary electrons are extracted or accelerated by the extractor and/or the anode to form a primary electron beam 202 that form a primary beam crossover (virtual or real) 203. Primary electron beam 202 may be visualized as being emitted from primary beam crossover 203.

Source conversion unit 220 may comprise an image-forming element array (not shown), an aberration compensator array (not shown), a beam-limit aperture array (not shown), and a pre-bending micro-deflector array (not shown). In some embodiments, the pre-bending micro-deflector array deflects a plurality of primary beamlets 211, 212, 213 of primary electron beam 202 to normally enter the beam-limit aperture array, the image-forming element array, and an aberration compensator array. In some embodiments, apparatus 104 may be operated as a single-beam system such that a single primary beamlet is generated. In some embodiments, condenser lens 210 is designed to focus primary electron beam 202 to become a parallel beam and be normally incident onto source conversion unit 220. The image-forming element array may comprise a plurality of micro-deflectors or micro-lenses to influence the plurality of primary beamlets 211, 212, 213 of primary electron beam 202 and to form a plurality of parallel images (virtual or real) of primary beam crossover 203, one for each of the primary beamlets 211, 212, and 213. In some embodiments, the aberration compensator array may comprise a field curvature compensator array (not shown) and an astigmatism compensator array (not shown). The field curvature compensator array may comprise a plurality of micro-lenses to compensate field curvature aberrations of the primary beamlets 211, 212, and 213. The astigmatism compensator array may comprise a plurality of micro-stigmators to compensate astigmatism aberrations of the primary beamlets 211, 212, and 213. The beam-limit aperture array may be configured to limit diameters of individual primary beamlets 211, 212, and 213. FIG. 2 shows three primary beamlets 211, 212, and 213 as an example, and it is appreciated that source conversion unit 220 may be configured to form any number of primary beamlets. Controller 109 may be connected to various parts of EBI system 100 of FIG. 1, such as source conversion unit 220, electron detection device 240, primary projection system 230, or motorized stage 209. In some embodiments, as explained in further details below, controller 109 may perform various image and signal processing functions. Controller 109 may also generate various control signals to govern operations of the charged particle beam inspection system.

Condenser lens 210 is configured to focus primary electron beam 202. Condenser lens 210 may further be configured to adjust electric currents of primary beamlets 211, 212, and 213 downstream of source conversion unit 220 by varying the focusing power of condenser lens 210. Alternatively, the electric currents may be changed by altering the radial sizes of beam-limit apertures within the beam-limit aperture array corresponding to the individual primary beamlets. The electric currents may be changed by both altering the radial sizes of beam-limit apertures and the focusing power of condenser lens 210. Condenser lens 210 may be an adjustable condenser lens that may be configured so that the position of its first principle plane is movable. The adjustable condenser lens may be configured to be magnetic, which may result in off-axis beamlets 212 and 213 illuminating source conversion unit 220 with rotation angles. The rotation angles change with the focusing power or the position of the first principal plane of the adjustable condenser lens. Condenser lens 210 may be an anti-rotation condenser lens that may be configured to keep the rotation angles unchanged while the focusing power of condenser lens 210 is changed. In some embodiments, condenser lens 210 may be an adjustable anti-rotation condenser lens, in which the rotation angles do not change when its focusing power and the position of its first principal plane are varied.

Objective lens 231 may be configured to focus beamlets 211, 212, and 213 onto a sample 208 for inspection and may form, in the current embodiments, three probe spots 221, 222, and 223 on the surface of sample 208. Coulomb aperture plate 271, in operation, is configured to block off peripheral electrons of primary electron beam 202 to reduce Coulomb effect. The Coulomb effect may enlarge the size of each of probe spots 221, 222, and 223 of primary beamlets 211, 212, 213, and therefore deteriorate inspection resolution.

Beam separator 233 may, for example, be a Wien filter comprising an electrostatic deflector generating an electrostatic dipole field and a magnetic dipole field (not shown in FIG. 2). In operation, beam separator 233 may be configured to exert an electrostatic force by electrostatic dipole field on individual electrons of primary beamlets 211, 212, and 213. The electrostatic force is equal in magnitude but opposite in direction to the magnetic force exerted by magnetic dipole field of beam separator 233 on the individual electrons. Primary beamlets 211, 212, and 213 may therefore pass at least substantially straight through beam separator 233 with at least substantially zero deflection angles.

Deflection scanning unit 232, in operation, is configured to deflect primary beamlets 211, 212, and 213 to scan probe spots 221, 222, and 223 across individual scanning areas in a section of the surface of sample 208. In response to incidence of primary beamlets 211, 212, and 213 or probe spots 221, 222, and 223 on sample 208, electrons emerge from sample 208 and generate three secondary electron beams 261, 262, and 263. Each of secondary electron beams 261, 262, and 263 typically comprise secondary electrons (having electron energy≤50 eV) and backscattered electrons (having electron energy between 50 eV and the landing energy of primary beamlets 211, 212, and 213). Beam separator 233 is configured to deflect secondary electron beams 261, 262, and 263 towards secondary projection system 250. Secondary projection system 250 subsequently focuses secondary electron beams 261, 262, and 263 onto detection elements 241, 242, and 243 of electron detection device 240. Detection elements 241, 242, and 243 are arranged to detect corresponding secondary electron beams 261, 262, and 263 and generate corresponding signals which are sent to controller 109 or a signal processing system (not shown), e.g., to construct images of the corresponding scanned areas of sample 208.

In some embodiments, detection elements 241, 242, and 243 detect corresponding secondary electron beams 261, 262, and 263, respectively, and generate corresponding intensity signal outputs (not shown) to an image processing system (e.g., controller 109). In some embodiments, each detection element 241, 242, and 243 may comprise one or more pixels. The intensity signal output of a detection element may be a sum of signals generated by all the pixels within the detection element.

In some embodiments, controller 109 may comprise image processing system that includes an image acquirer (not shown), a storage (not shown). The image acquirer may comprise one or more processors. For example, the image acquirer may comprise a computer, server, mainframe host, terminals, personal computer, any kind of mobile computing devices, and the like, or a combination thereof. The image acquirer may be communicatively coupled to electron detection device 240 of apparatus 104 through a medium such as an electrical conductor, optical fiber cable, portable storage media, IR, Bluetooth, internet, wireless network, wireless radio, among others, or a combination thereof. In some embodiments, the image acquirer may receive a signal from electron detection device 240 and may construct an image. The image acquirer may thus acquire images of sample 208. The image acquirer may also perform various post-processing functions, such as generating contours, superimposing indicators on an acquired image, and the like. The image acquirer may be configured to perform adjustments of brightness and contrast, etc. of acquired images. In some embodiments, the storage may be a storage medium such as a hard disk, flash drive, cloud storage, random access memory (RAM), other types of computer readable memory, and the like. The storage may be coupled with the image acquirer and may be used for saving scanned raw image data as original images, and post-processed images.

In some embodiments, the image acquirer may acquire one or more images of a sample based on an imaging signal received from electron detection device 240. An imaging signal may correspond to a scanning operation for conducting charged particle imaging. An acquired image may be a single image comprising a plurality of imaging areas. The single image may be stored in the storage. The single image may be an original image that may be divided into a plurality of regions. Each of the regions may comprise one imaging area containing a feature of sample 208. The acquired images may comprise multiple images of a single imaging area of sample 208 sampled multiple times over a time sequence. The multiple images may be stored in the storage. In some embodiments, controller 109 may be configured to perform image processing steps with the multiple images of the same location of sample 208.

In some embodiments, controller 109 may include measurement circuitries (e.g., analog-to-digital converters) to obtain a distribution of the detected secondary electrons. The electron distribution data collected during a detection time window, in combination with corresponding scan path data of each of primary beamlets 211, 212, and 213 incident on the wafer surface, can be used to reconstruct images of the wafer structures under inspection. The reconstructed images can be used to reveal various features of the internal or external structures of sample 208, and thereby can be used to reveal any defects that may exist in the wafer.

In some embodiments, controller 109 may control motorized stage 209 to move sample 208 during inspection of sample 208. In some embodiments, controller 109 may enable motorized stage 209 to move sample 208 in a direction continuously at a constant speed. In other embodiments, controller 109 may enable motorized stage 209 to change the speed of the movement of sample 208 overtime depending on the steps of scanning process.

Although FIG. 2 shows that apparatus 104 uses three primary electron beams, it is appreciated that apparatus 104 may use two or more number of primary electron beams. The present disclosure does not limit the number of primary electron beams used in apparatus 104. In some embodiments, apparatus 104 may be a SEM used for lithography. In some embodiments, electron beam tool 104 may be a single-beam system or a multi-beam system.

Compared with a single charged-particle beam imaging system ("single-beam system"), a multiple charged-particle beam imaging system ("multi-beam system") may be designed to optimize throughput for different scan modes. Embodiments of this disclosure provide a multi-beam system with the capability of optimizing throughput for different scan modes by using beam arrays with different geometries. adapting to different throughputs and resolution requirements.

Figure 3:
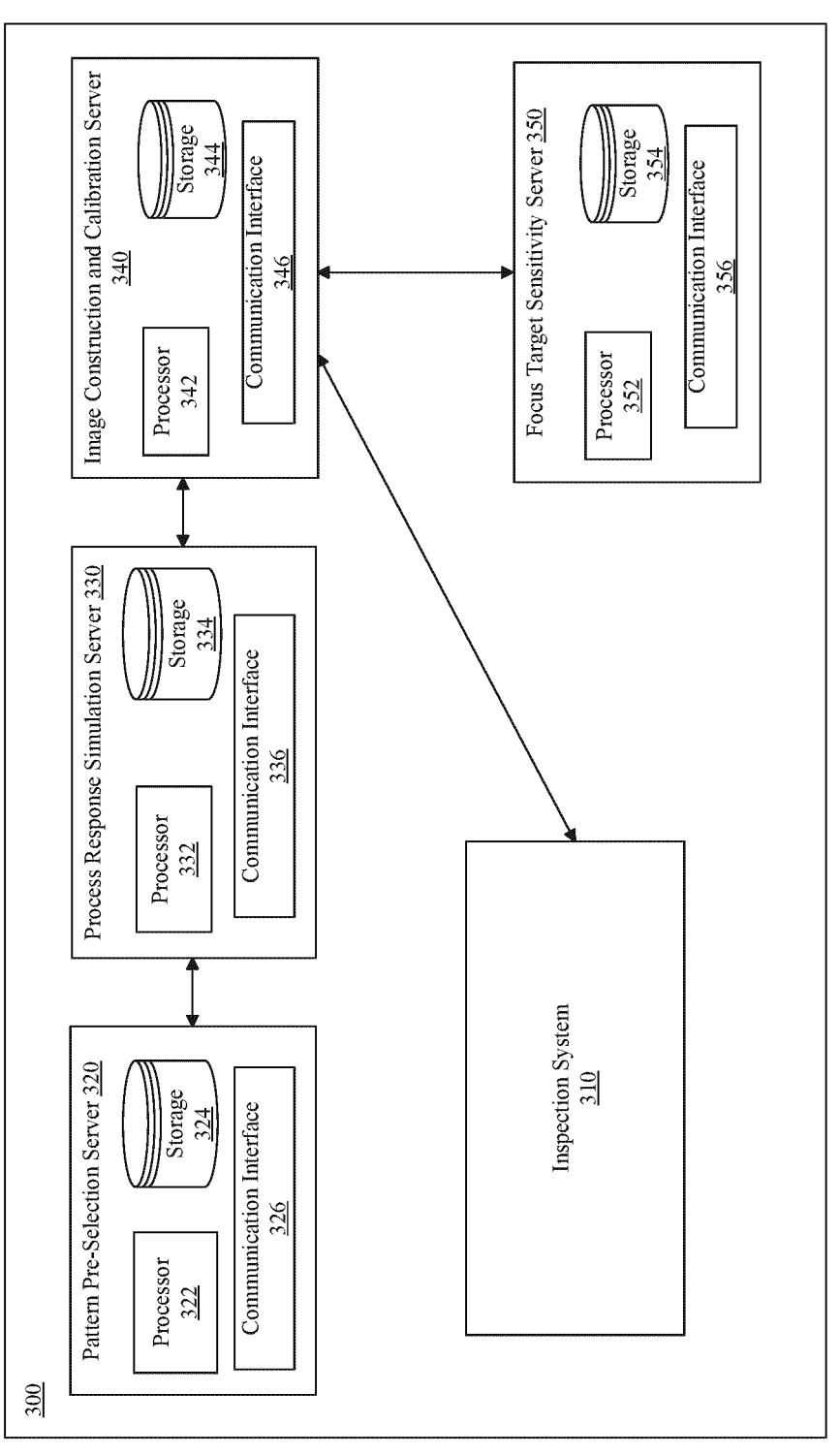
FIG. 3 is a schematic diagram of an exemplary system for determining LFPs on a sample, consistent with embodiments of the present disclosure.

FIG. 3 illustrates a schematic diagram of a system 300 for determining LFPs on a sample (e.g., sample 208 of FIG. 2). System 300 may include an inspection system 310, a pattern pre-selection server 320, a process response simulation server 330, an image construction and calibration server 340, and a focus target sensitivity server 350. Inspection system 310, pattern pre-selection server 320, process response simulation server 330, image construction and calibration server 340, and focus target sensitivity server 350 may be electrically coupled (directly or indirectly) to each other, either physically (e.g., by a cable) or remotely. Inspection system 310 may be the system described with respect to FIGS. 1 and 2, used to acquire images of a wafer (see, e.g., sample 208 of FIG. 2).

Pattern pre-selection server 320 may include a processor 322 and a storage 324. Pattern pre-selection server 320 may also include a communication interface 326 to send data to process response simulation server 330. Processor 322 may be configured to receive one or more resist pattern designs (e.g., from one or more users) to be used for development (e.g., lithography) of a sample. A resist pattern design may include one or more layout structures (e.g., layout structure 403 of FIG. 4) that may be developed on the sample. A resist pattern design may be stored in a layout file for a wafer design. The layout file can be in a Graphic Database System (GDS) format, Graphic Database System II (GDS II) format, an Open Artwork System Interchange Standard (OASIS) format, a Caltech Intermediate Format (CIF), etc. The wafer design may include patterns or structures for inclusion on the wafer. The patterns or structures can be mask patterns used to transfer features from the photolithography masks or reticles to a wafer. In some embodiments, a layout in GDS or OASIS format, among others, may comprise feature information stored in a binary file format representing planar geometric shapes, text, and other information related to the wafer design. In some embodiments, a resist pattern design may correspond to a field of view (FOV) of inspection system 310 (e.g., a FOV of inspection system 310 may include one or more layout structures of a resist pattern design).

Processor 322 may analyze the one or more resist pattern designs and group the resist pattern designs by pattern type (e.g., shape types of resist pattern designs). For example, processor 322 may group resist pattern designs that are shaped to include a number of contact holes in the sample with other resist pattern designs that are shaped to include the same number of contact holes in the sample. Based on the grouped resist pattern designs, processor 322 may sample one or more resist pattern designs from each group to determine LFPs. By selecting a representative number of resist pattern designs from each group, processor 322 may reduce the number of resist pattern designs that are analyzed in system 300, thereby reducing the likelihood of repeated resist pattern design analyses and advantageously increasing system throughput. Pattern pre-selection server 320 may transmit data including the selected resist pattern designs to process response simulation server 330.

Process response simulation server 330 may include a processor 332 and a storage 334. Process response simulation server 330 may also include a communication interface 336 to receive data from pattern pre-selection server 320 and to send data to image construction and calibration server 340. Processor 332 may be configured to receive one or more selected resist pattern designs from pattern pre-selection server 320. Processor 332 may be configured to generate contour images (e.g., contour image 401 of FIG. 4, contour images 501, 503, 505, and 507 of FIG. 5) of the selected resist pattern designs. In some embodiments, processor 332 may be configured to perform a plurality of process simulations using the selected resist pattern designs. For example, processor 332 may receive a set of process variations and the process simulations may include the received set of process variations during sample (e.g., wafer) processing. In some embodiments, the process variations may include at least one of data defining a plurality of focus adjustments (e.g., focus height 280 of FIG. 2, which is between the objective lens and the sample such that the focal length ranges from negative to positive values) of light emitted onto a resist pattern on a sample or data defining a plurality of adjustments related to intensity of light (e.g., light dosage) emitted onto a resist pattern. In some embodiments, the process simulations using the set of process variations may be performed using at least one of resist models, development (e.g., lithography) models, etching models, scanning models (e.g., scanner lens models), etc. For example, the models may use parameters known from physics-based models and materials.

In some embodiments, processor 332 may perform a plurality of process simulations on each of the selected resist pattern designs and generate a contour image of each resist pattern design based on the process simulations. Processor 332 may generate contour images that depict the effect of the process variations on each of the resist pattern designs. For example, the generated contour images may depict the effect of different focus heights on the resulting sharpness of the resist pattern during sample processing.

In some embodiments, the results of the performed process simulations may include dimensions of features on the resist patterns. In some embodiments, hotspots (e.g., defects such as necking, bridging, edge placement error, etc.) may be defined (e.g., by a user) based on dimensions of features on a resist pattern. For example, a threshold (e.g., 20 nm) may be defined such that feature widths on a resist pattern that are below the threshold are identified as a hotspot (e.g., necking) that should be excluded from the determined LFPs. In some embodiments, one or more thresholds (e.g., a range) for sidewall angles of a feature may be defined such that processor 332 determines that features with sidewall angles outside of the threshold are hotspots. In some embodiments, processor 332 may determine a plurality of candidate resist patterns based on the selected resist pattern designs, where the plurality of candidate resist patterns exclude resist patterns containing hotspots. In some embodiments, the plurality of candidate resist patterns may include resists containing a limited number of hotspots. Process response simulation server 330 may transmit data including the candidate resist patterns to image construction and calibration server 340.

Image construction and calibration server 340 may include a processor 342 and a storage 344. Image construction and calibration server 340 may also include a communication interface 346 to receive data from process response simulation server 330 and to send data to focus target sensitivity server 350. Processor 342 may be configured to receive one or more candidate resist pattern designs from process response simulation server 330. Processor 342 may be configured to generate SEM images (e.g., grey-scale voltage contrast images) of the candidate resist pattern designs. In some embodiments, processor 342 may be configured to perform a plurality of process simulations using the candidate resist pattern designs. For example, processor 342 may receive image parameter variations to use in the process simulations and the process simulations may include simulating the effects of the image parameter variations during sample (e.g., wafer) processing. In some embodiments, the process variations may include at least one of data defining a plurality of focus adjustments (e.g., focus height between the objective lens and the sample such that the focal length ranges from negative to positive values) of electron beams emitted onto a resist pattern on a sample, shifting image-related measurements (e.g., brightness or contrast to represent the sample comprising different materials, shifts in the inspection tool, sample processing shifts, sample position shifts, noise, etc.), or a parameter used by a photolithography system when determining an exposure setting for a sample carrying one or more of the plurality of candidate resist pattern designs. For example, processor 342 may change the brightness level of a generated SEM image by a percentage to simulate noise during inspection. In some embodiments, the process simulations using the image parameter variations may be performed using at least one of resist models, development (e.g., lithography) models, etching models, scanning models (e.g., scanner lens models), etc. For example, the models may use parameters known from physics-based models and materials.

In some embodiments, processor 342 may perform a plurality of process simulations on each of the candidate resist pattern designs and generate a SEM image of each resist pattern based on the process simulations. Processor 342 may generate SEM images that depict the effect of the image parameter variations on each of the resist patterns. For example, the generated SEM images may depict the effect of different focus heights on the resulting resolution of the SEM image of the resist pattern during sample processing.

In some embodiments, system 300 may operate in real-time during inspection such that image construction and calibration server 340 may receive real SEM images generated during inspection from inspection system 310. In some embodiments, processor 342 may generate SEM images using real SEM images by adding the effects of process variations, as described above, to the real SEM images. In some embodiments, real SEM images generated during actual inspection may be used to calibrate the inspection tool such that focusing of the inspection tool is more accurate. In some embodiments, real SEM images may be used to calibrate the models used in image construction and calibration server 340. For example, image construction and calibration server 340 may compare key performance indicators (KPIs) (e.g., defects, line-edge roughness, line-width roughness, local critical dimension uniformity, grey level, brightness, contrast, background noise, etc.) of the SEM images generated during the process simulations to KPIs of the SEM images generated during actual inspection and adjust parameters of one or more models based on a difference in KPIs between the simulated SEM images and the actual SEM images from inspection. Image construction and calibration server 340 may transmit data including the generated SEM images to focus target sensitivity server 350.

Focus target sensitivity server 350 may include a processor 352 and a storage 354. Focus target sensitivity server 350 may also include a communication interface 356 to receive data from image construction and calibration server 340. Processor 352 may be configured to receive one or more generated SEM images from image construction and calibration server 340. Processor 352 may be configured to determine focus-related characteristics for the plurality of candidate resist pattern designs based on the generated SEM images. In some embodiments, focus-related characteristics may include at least one of resist pattern density, number of layout structures in a resist pattern, a ratio of number of acceptable layout structures to number of unacceptable layout structures, sidewall angles in a resist pattern, a ratio of number of acceptable sidewall angles to number of unacceptable sidewall angles, or charging effects (e.g., pattern shape, pattern surface area, etc.). Processor 352 may be configured to determine a plurality of LFPs on the plurality of candidate resist pattern designs based on the determined focus-related characteristics. The LFPs may be determined based on locations on the candidate resist pattern designs that are robust and most sensitive to adjustments in focus. In some embodiments, the LFPs may be determined based on weighted values assigned to the focus-related characteristics (e.g., focus-related characteristics that are more significant are assigned a higher weighted value than focus-related characteristics that are less significant). In some embodiments, the LFPs to be used during inspection may be selected based one or more of a predetermined number (e.g., the top 10% of highest ranked LFPs) of LFPs or layout structure coverage on a sample (e.g., based on number of layout structures in a resist pattern in a FOV, a ratio of number of acceptable layout structures to number of unacceptable layout structures, etc.).

Resist pattern density may be the number of layout structures in a FOV. In some embodiments, resist patterns with higher densities may be more desirable for LFPs since dense resist patterns may have a more stable focus during lithography. However, in some embodiments, dense resist patterns may not be desirable for LFPs since dense resist patterns may result in lower resolution, rough patterns, or defects that are not suitable for image focusing. In some embodiments, resist patterns with lower densities may be more desirable for LFPs since lower density resist patterns may have more isolated features that are focus-sensitive. However, in some embodiments, lower density resist patterns may not be desirable for LFPs since the features may have shorter widths that may be considered hotspots.

In some embodiments, focus target sensitivity server 350 may include rules that define characteristics of layout structures that make the layout structures acceptable and characteristics of layout structures that make the layout structures unacceptable. For example, the acceptability of a layout structure may be defined by minimum or maximum dimensions, pitch, sidewall angles, etc. of a layout structure. Resist patterns with higher ratios of acceptable layout structures to unacceptable layout structures are more desirable for LFPs since higher ratios increase the likelihood for adjusting focus at a useful LFP during inspection. In some embodiments, focus target sensitivity server 350 may include a threshold ratio for determining whether a resist pattern includes LFPs (e.g., resist patterns where 90% or more of the layout structures are acceptable may be candidates for LFPs).

In some embodiments, resist patterns with smaller sidewall angles (e.g., steeper sidewalls) may be more desirable for LFPs since the focus height along a steep sidewall may change more sharply (e.g., steep sidewalls may be more focus-sensitive). In some embodiments, resist patterns with larger sidewall angles (e.g., less steep sidewalls) may be more desirable for LFPs since the resist patterns during the actual inspection may not have steep sidewalls. In some embodiments, focus target sensitivity server 350 may include rules that define a range of sidewall angles that are acceptable and a range of sidewall angles that are unacceptable. For examples, the rules may include a percentage difference (e.g., +/−5%) from a normal (e.g., mean) sidewall angle. Resist patterns with higher ratios of acceptable sidewall angles to unacceptable sidewall angles are more desirable for LFPs since higher ratios increase the likelihood for adjusting focus at a useful LFP during inspection.

In some embodiments, sample charging may be affected during sample processing. For example, sample materials or adjustments in scanning speed or direction may result in a surface charging imbalance, thereby affecting resist pattern shapes or surface areas. These effects from surface charging imbalances may make focus adjustments more difficult, making areas with surface charging imbalances undesirable for LFPs.

In some embodiments, system 300 may output the LFPs to be used during inspection as a list of coordinates on a sample. In some embodiments, the LFPs may be ranked and determined based on pre-determined preferences. For example, the resulting LFPs may be evenly distributed on a sample based on predetermined preferences for focus-sensitive, robust LFPs or for samples where the target points of interest on the sample are unknown.

Figure 4:
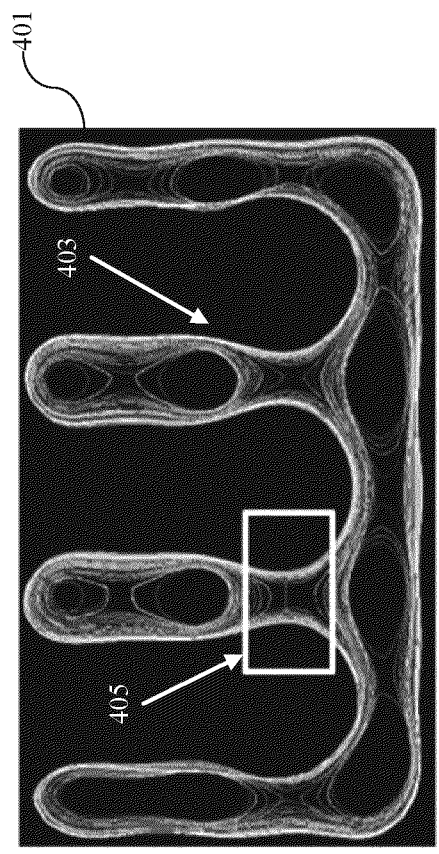
FIG. 4 is a schematic diagram illustrating an exemplary contour image of a resist pattern design, consistent with embodiments of the present disclosure.

Reference is now made to FIG. 4, a schematic diagram illustrating an exemplary contour image of a resist pattern design, consistent with embodiments of the present disclosure.

As described above, processor 332 may be configured to generate a contour image 401 of the selected resist pattern designs, including layout structure 403. In some embodiments, processor 332 may be configured to perform a plurality of process simulations using the selected resist pattern designs. In some embodiments, contour image 401 may depict the effect of process variations on the resist pattern designs.

In some embodiments, the results of the performed process simulations may include dimensions of features on the resist patterns. For example, hotspot 405 may be defined (e.g., by a user) based on dimensions of features on a resist pattern. For example, hotspot 405 may be determined to be a hotspot based on its width being below a threshold (e.g., 20 nm). As a result, the resist pattern associated with contour image 401 may be excluded from the determined LFPs.

Figure 5:
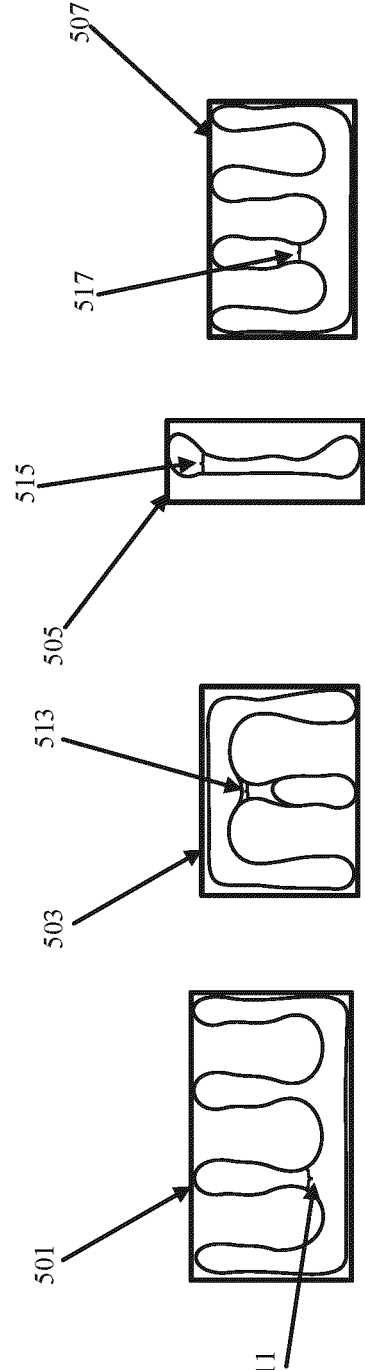
FIG. 5 is a schematic diagram illustrating exemplary contour images of resist pattern designs, consistent with embodiments of the present disclosure.

Reference is now made to FIG. 5, a schematic diagram illustrating exemplary contour images of resist pattern designs, consistent with embodiments of the present disclosure.

As described above, processor 332 may be configured to generate contour images 501, 503, 505, and 507 of selected resist pattern designs. In some embodiments, processor 332 may be configured to perform a plurality of process simulations using the selected resist pattern designs. For example, contour images 501 and 503 may depict the effect of simulated etching of samples associated with the related resist patterns while contour images 505 and 507 may depict the effect of simulated development of samples associated with the related resist patterns.

In some embodiments, the results of the performed process simulations may include dimensions of features on the resist patterns. For example, hotspots may be defined (e.g., by a user) based on dimensions of features on a resist pattern. For example, a hotspot may be defined by a width of a feature being below a threshold (e.g., 20 nm). For example, width 511 associated with contour image 501 and width 513 associated with contour image 503 may be below the hotspot threshold, thereby resulting in the resist patterns associated with contour images 501 and 503 being excluded from the determined LFPs. Width 515 associated with contour image 505 and width 517 associated with contour image 507 may be above the hotspot threshold, thereby resulting in the resist patterns associated with contour images 505 and 507 being included in the determined LFPs.

Figure 6:
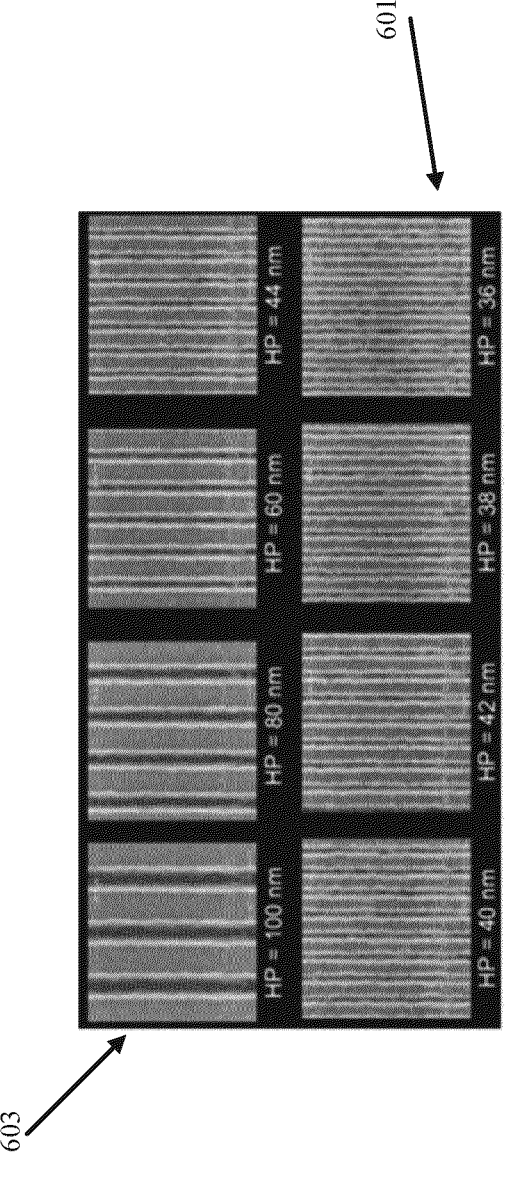
FIG. 6 is a schematic diagram illustrating generated SEM images, consistent with embodiments of the present disclosure.

Reference is now made to FIG. 6, a schematic diagram illustrating generated SEM images, consistent with embodiments of the present disclosure.

As described above, processor 342 may be configured to generate SEM images (e.g., grey-scale voltage contrast images) of the candidate resist pattern designs. In some embodiments, processor 342 may be configured to perform a plurality of process simulations using the candidate resist pattern designs. In some embodiments, processor 342 may perform a plurality of process simulations on each of the candidate resist pattern designs and generate a SEM image of each resist pattern based on the process simulations. Processor 342 may generate SEM images that depict the effect of the image parameter variations on each of the resist patterns.

Resist pattern density may be the number of layout structures in a FOV. In some embodiments, resist patterns with higher densities, such as those associated with generated SEM image 601, may be more desirable for LFPs since denser resist patterns may have a more stable focus during lithography. However, in some embodiments, denser resist patterns may not be desirable for LFPs since dense resist patterns may result in lower resolution, rough patterns, or defects that are not suitable for image focusing. In some embodiments, resist patterns with lower densities, such as those associated with generated SEM image 603, may be more desirable for LFPs since lower density resist patterns may have more isolated features that are focus-sensitive. However, in some embodiments, lower density resist patterns may not be desirable for LFPs since the features may have shorter widths that may be considered hotspots.

Reference is now made to FIG. 7, a flowchart illustrating an exemplary process 700 of determining LFPs on a sample, consistent with embodiments of the present disclosure. The steps of method 700 can be performed by a system (e.g., system 300 of FIG. 3) executing on or otherwise using the features of a computing device, e.g., controller 109 of FIG. 1 for purposes of illustration. It is appreciated that the illustrated method 700 can be altered to modify the order of steps and to include additional steps.

At step 701, the system (e.g., using processor 322 of FIG. 3) may select a first plurality of resist pattern designs. For example, the system may be configured to receive one or more resist pattern designs (e.g., from one or more users) to be used for development (e.g., lithography) of a sample. A resist pattern design may include one or more layout structures (e.g., layout structure 403 of FIG. 4) that may be developed on the sample. In some embodiments, a resist pattern design may correspond to a field of view (FOV) of an inspection system (e.g., inspection system 310 of FIG. 3) (e.g., a FOV of inspection system 310 may include one or more layout structures of a resist pattern design).

The system may analyze the one or more resist pattern designs and group the resist pattern designs by pattern type (e.g., shape types of resist pattern designs). For example, the system may group resist pattern designs that are shaped to include a number of contact holes in the sample with other resist pattern designs that are shaped to include the same number of contact holes in the sample. Based on the grouped resist pattern designs, the system may sample one or more resist pattern designs from each group to determine LFPs. By selecting a representative number of resist pattern designs from each group, the system may reduce the number of resist pattern designs that are analyzed in the system, thereby reducing the likelihood of repeated resist pattern design analyses and advantageously increasing system throughput.

At step 703, the system (e.g., process response simulation server 330 of FIG. 3) may perform a plurality of process simulations using the first plurality of resist pattern designs. The system (e.g., processor 332 of FIG. 3) may be configured to generate contour images (e.g., contour image 401 of FIG. 4, contour images 501, 503, 505, and 507 of FIG. 5) of the selected resist pattern design designs. The process simulations may include a set of process variations during sample (e.g., wafer) processing. In some embodiments, the process variations may include at least one of data defining a plurality of focus adjustments (e.g., focus height between the objective lens and the sample such that the focal length ranges from negative to positive values) of light emitted onto a resist pattern on a sample or data defining a plurality of adjustments related to the intensity of light (e.g., light dosage) emitted onto a resist pattern. In some embodiments, the process simulations using the set of process variations may be performed using at least one of resist models, development (e.g., lithography) models, etching models, scanning models (e.g., scanner lens models), etc. For example, the models may use parameters known from physics-based models and materials.

In some embodiments, the system may perform a plurality of process simulations on each of the selected resist pattern designs and generate a contour image of each resist pattern design based on each of the process simulations (e.g., in some embodiments one contour image of each resist pattern design is generated for each process simulation). The system may generate contour images that depict the effect of the process variations on each of the resist pattern designs. For example, the generated contour images may depict the effect of different focus heights on the resulting sharpness of the resist pattern during sample processing.

At step 705, the system (e.g., processor 332 of FIG. 3) may identify a hotspot (e.g., hotspot 405 of FIG. 4) that corresponds to a resist pattern design based on the results of the performed process simulations. In some embodiments, the results of the performed process simulations may include dimensions of features on the resist pattern designs. In some embodiments, hotspots (e.g., defects) may be defined (e.g., by a user) based on dimensions of features on a resist pattern design. For example, a threshold (e.g., 20 nm) may be defined such that feature widths on a resist pattern design that are below the threshold are identified as a hotspot (e.g., necking) that should be excluded from the determined LFPs. In some embodiments, one or more thresholds (e.g., a range) for sidewall angles of a feature may be defined such that the system determines that features with sidewall angles outside of the threshold are hotspots. In some embodiments, the system may determine a plurality of candidate resist patterns based on the selected resist pattern designs, where the plurality of candidate resist patterns exclude resist patterns containing hotspots.

At step 707, the system (e.g., processor 342 of FIG. 3) may determine focus-related characteristics that correspond to a plurality of candidate resist pattern designs, wherein the plurality of candidate resist pattern designs is a subset of the first plurality of resist pattern designs and the subset is selected based on the identified hotspot. The system may be configured to generate SEM images (e.g., grey-scale voltage contrast images) (e.g., SEM images 601 or 603 of FIG. 6) of the candidate resist pattern designs. In some embodiments, the system may be configured to perform a plurality of process simulations using the candidate resist pattern designs. For example, the process simulations may include simulating the effects of image parameter variations during sample (e.g., wafer) processing. In some embodiments, the process variations may include at least one of data defining a plurality of focus adjustments (e.g., adjusting the focus height between the objective lens and the sample such that the focal length ranges from negative to positive values) of electron beams directed onto a resist pattern on a sample, shifting image-related measurements (e.g., brightness or contrast to represent the sample comprising different materials, shifts in the inspection tool, sample processing shifts, sample position shifts, noise, etc.), or a parameter used by a photolithography system when determining an exposure setting for a sample carrying one or more of the plurality of candidate resist pattern designs. For example, the system may change the brightness level of a generated SEM image by a percentage to simulate noise during inspection. In some embodiments, the process simulations simulating the effects of the image parameter variations may be performed using at least one of resist models, development (e.g., lithography) models, etching models, scanning models (e.g., scanner lens models), etc. For example, the models may use parameters known from physics-based models and materials.

In some embodiments, the system may perform a plurality of process simulations on each of the candidate resist pattern designs and generate a SEM image of each resist pattern design based on the process simulations. The system may generate SEM images that depict the effect of the image parameter variations on each of the resist pattern designs. For example, the generated SEM images may depict the effect of different focus heights on the resulting resolution of the SEM image of the resist pattern design during sample processing.

The system (e.g., processor 352 of FIG. 3) may be configured to determine focus-related characteristics for the plurality of candidate resist pattern designs based on the generated SEM images. In some embodiments, focus-related characteristics may include at least one of resist pattern density, number of layout structures in a resist pattern design, a ratio of number of acceptable layout structures to number of unacceptable layout structures, sidewall angles in a resist pattern design, a ratio of number of acceptable sidewall angles to number of unacceptable sidewall angles, or charging effects.

At step 709, the system (e.g., processor 352 of FIG. 3) may be configured to determine a plurality of LFPs on the plurality of candidate resist pattern designs based on the determined focus-related characteristics. The LFPs may be determined based on locations on the candidate resist pattern designs that are robust and most sensitive to adjustments in focus. In some embodiments, the LFPs may be determined based on weighted values assigned to the focus-related characteristics (e.g., focus-related characteristics that are more significant are assigned a higher weighted value than focus-related characteristics that are less significant). In some embodiments, the LFPs to be used during inspection may be selected based on one or more of a predetermined number (e.g., the top 10% of highest ranked LFPs) of LFPs or layout structure coverage on a sample (e.g., based on number of layout structures in a resist pattern design, a ratio of number of acceptable layout structures to number of unacceptable layout structures, etc.).

In some embodiments, the system may output the LFPs to be used during inspection as a list of coordinates on a sample. In some embodiments, the LFPs may be ranked and determined based on pre-determined preferences. For example, the resulting LFPs may be evenly distributed on a sample based on predetermined preferences for focus-sensitive, robust LFPs or for samples where the target points of interest on the sample are unknown.

A non-transitory computer readable medium may be provided that stores instructions for a processor of a controller (e.g., controller 109 of FIG. 1) for controlling the electron beam tool or processors (e.g., processors 322, 332, 342, or 352 of FIG. 3) of other systems and servers, consistent with embodiments in the present disclosure. These instructions may allow the one or more processors to carry out image processing, data processing, beamlet scanning, database management, graphical display, operations of a charged particle beam apparatus, or another imaging device, or the like. In some embodiments, the non-transitory computer readable medium may be provided that stores instructions for a processor to perform the steps of process 700. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

The embodiments may further be described using the following clauses:

1. A system for determining local focus points (LFPs) on a sample, the system comprising: a controller including circuitry configured to cause the system to perform: selecting a first plurality of resist pattern designs; performing a plurality of process simulations using the first plurality of resist pattern designs; identifying a hotspot that corresponds to a resist pattern design based on results of the performed process simulations; determining focus-related characteristics that correspond to a plurality of candidate resist pattern designs, wherein the plurality of candidate resist pattern designs is a subset of the first plurality of resist pattern designs and the subset is selected based on the identified hotspot; and determining locations of a plurality of LFPs based on the generated focus-related characteristics.

2. The system of clause 1, wherein selecting the plurality of resist pattern designs comprises: analyzing a second plurality of resist pattern designs; grouping the second plurality of resist pattern designs by pattern types; and sampling a resist pattern design from each group of the second plurality of resist pattern designs, wherein the selection of the first plurality of resist pattern designs is based on the sampled resist pattern designs.

3. The system of clause 2, wherein each of the pattern types comprises a shape type of a resist pattern design.

4. The system of any one of clauses 1-3, wherein performing the plurality of process simulations comprises generating contour images based on the first plurality of resist pattern designs.

5. The system of clause 4, wherein the circuitry is further configured to cause the system to perform: receiving a set of process variations, wherein the plurality of process simulations are based on the received set of process variations, and wherein the contour images depict effects of the set of process variations on features on the sample that correspond to the first plurality of resist pattern designs.

6. The system of clause 5, wherein the set of process variations comprise any of data defining a plurality of focus of light adjustments that correspond to the first plurality of resist pattern designs or data defining a plurality of light intensity adjustments that correspond to the first plurality of resist pattern designs.

7. The system of any one of clauses 1-6, wherein performing the plurality of process simulations comprises using any of a resist model, lithography model, etching model, or scanning model.

8. The system of any one of clauses 1-7, wherein the results of the performed process simulations comprise dimensions of features on the sample that correspond to the first plurality of resist pattern designs.

9. The system of clause 8, wherein the circuitry is further configured to cause the system to perform: identifying the hotspot in a feature where the dimension of the feature is below a threshold.

10. The system of any one of clauses 1-9, wherein the hotspot comprises an area with a higher likelihood of a defect being present in a feature on the sample that corresponds to any of the first plurality of resist pattern designs.

11. The system of any one of clauses 1-10, wherein determining focus-related characteristics that correspond to the plurality of candidate resist pattern designs comprises generating simulated scanning electron microscope (SEM) images of features on the sample that correspond to the plurality of candidate resist pattern designs.

12. The system of clause 11, wherein the circuitry is further configured to cause the system to perform: receiving image parameter variations to be used in a plurality of simulations that simulate effects of the image parameter variations, and wherein the simulated SEM images depict the effects of the image parameter variations on the features on the sample that correspond to the plurality of candidate resist pattern designs.

13. The system of clause 12, wherein the image parameter variations comprise any of data defining a plurality of focus of electron beam adjustments that correspond to the plurality of candidate resist pattern designs, a shift in image-related measurements, or a parameter used by a photolithography system when determining an exposure setting for a sample that is to include features that correspond to the plurality of candidate resist pattern designs.

14. The system of any one of clauses 1-13, wherein the determined focus-related characteristics comprise any of resist pattern density, number of layout structures in a resist pattern design, a ratio of number of acceptable layout structures to number of unacceptable layout structures, a sidewall angle that corresponds to a resist pattern design, a ratio of number of acceptable sidewall angles to number of unacceptable sidewall angles, or a charging effect.

15. The system of any one of clauses 1-14, wherein determining the plurality of LFPs based on the determined focus-related characteristics comprises: determining locations on the sample that correspond to the plurality of candidate resist pattern designs and that comprise higher sensitivities to adjustments in focus of electron beams on the locations; and selecting a set of the determined locations as the LFPs.

16. A method for determining local focus points (LFPs) on a sample, the method comprising:
selecting a first plurality of resist pattern designs; performing a plurality of process simulations using the first plurality of resist pattern designs; identifying a hotspot that corresponds to a resist pattern design based on results of the performed process simulations;
determining focus-related characteristics that correspond to a plurality of candidate resist pattern designs, wherein the plurality of candidate resist pattern designs is a subset of the first plurality of resist pattern designs and the subset is selected based on the identified hotspot; and determining locations of a plurality of LFPs based on the generated focus-related characteristics.

17. The method of clause 16, wherein selecting the plurality of resist pattern designs comprises: analyzing a second plurality of resist pattern designs; grouping the second plurality of resist pattern designs by pattern types; and sampling a resist pattern design from each group of the second plurality of resist pattern designs, wherein the selection of the first plurality of resist pattern designs is based on the sampled resist pattern designs.

18. The method of clause 17, wherein each of the pattern types comprises a shape type of a resist pattern design.

19. The method of any one of clauses 16-18, wherein performing the plurality of process simulations comprises generating contour images based on the first plurality of resist pattern designs.

20. The method of clause 19, further comprising: receiving a set of process variations, wherein the plurality of process simulations are based on the received set of process variations, and wherein the contour images depict effects of the set of process variations on features on the sample that correspond to the first plurality of resist pattern designs.

21. The method of clause 20, wherein the set of process variations comprise any of data defining a plurality of focus of light adjustments that correspond to the first plurality of resist pattern designs or data defining a plurality of light intensity adjustments that correspond to the first plurality of resist pattern designs.

22. The method of any one of clauses 16-21, wherein performing the plurality of process simulations comprises using any of a resist model, lithography model, etching model, or scanning model.

23. The method of any one of clauses 16-22, wherein the results of the performed process simulations comprise dimensions of features on the sample that correspond to the first plurality of resist pattern designs.

24. The method of clause 23, further comprising identifying the hotspot in a feature where the dimension of the feature is below a threshold.

25. The method of any one of clauses 16-24, wherein the hotspot comprises an area with a higher likelihood of a defect being present in a feature on the sample that corresponds to any of the first plurality of resist pattern designs.

26. The method of any one of clauses 16-25, wherein determining focus-related characteristics that correspond to the plurality of candidate resist pattern designs comprises generating simulated scanning electron microscope (SEM) images of features on the sample that correspond to the plurality of candidate resist pattern designs.

27. The method of clause 26, further comprising: receiving image parameter variations to be used in a plurality of simulations that simulate effects of the image parameter variations, and wherein the simulated SEM images depict the effects of the image parameter variations on the features on the sample that correspond to the plurality of candidate resist pattern designs.

28. The method of clause 27, wherein the image parameter variations comprise any of data defining a plurality of focus of electron beam adjustments that correspond to the plurality of candidate resist pattern designs, a shift in image-related measurements, or a parameter used by a photolithography system when determining an exposure setting for a sample that is to include features that correspond to the plurality of candidate resist pattern designs.

29. The method of any one of clauses 16-28, wherein the determined focus-related characteristics comprise any of resist pattern density, number of layout structures in a resist pattern design, a ratio of number of acceptable layout structures to number of unacceptable layout structures, a sidewall angle that corresponds to a resist pattern design, a ratio of number of acceptable sidewall angles to number of unacceptable sidewall angles, or a charging effect.

30. The method of any one of clauses 16-29, wherein determining the plurality of LFPs based on the determined focus-related characteristics comprises: determining locations on the sample that correspond to the plurality of candidate resist pattern designs that comprise higher sensitivities to adjustments in focus of electron beams on the locations; and selecting a set of the determined locations as the LFPs.

31. A non-transitory computer readable medium that stores a set of instructions that is executable by at least one processor of a computing device to cause the computing device to perform a method for determining local focus points (LFPs) on a sample, the method comprising: selecting a first plurality of resist pattern designs; performing a plurality of process simulations using the first plurality of resist pattern designs; identifying a hotspot that corresponds to a resist pattern design based on results of the performed process simulations; determining focus-related characteristics that correspond to a plurality of candidate resist pattern designs, wherein the plurality of candidate resist pattern designs is a subset of the first plurality of resist pattern designs and the subset is selected based on the identified hotspot; and determining locations of a plurality of LFPs based on the generated focus-related characteristics.

32. The non-transitory computer readable medium of clause 31, wherein the set of instructions that is executable by the at least one processor of the computing device to cause the computing device to further perform: analyzing a second plurality of resist pattern designs; grouping the second plurality of resist pattern designs by pattern types; and sampling a resist pattern design from each group of the second plurality of resist pattern designs, wherein the selection of the first plurality of resist pattern designs is based on the sampled resist pattern design.

33. The non-transitory computer readable medium of clause 32, wherein each of the pattern types comprises a shape type of a resist pattern design.

34. The non-transitory computer readable medium of any one of clauses 31-33, wherein performing the plurality of process simulations comprises generating contour images based on the first plurality of resist pattern designs.

35. The non-transitory computer readable medium of clause 34, the set of instructions that is executable by the at least one processor of the computing device to cause the computing device to further perform: receiving a set of process variations, wherein the plurality of process simulations are based on the received set of process variations, and wherein the contour images depict effects of the set of process variations on features on the sample that correspond to the first plurality of resist pattern designs.

36. The non-transitory computer readable medium of clause 35, wherein the set of process variations comprise any of data defining a plurality of focus of light adjustments that correspond to the first plurality of resist pattern designs or data defining a plurality of light intensity adjustments that correspond to the first plurality of resist pattern designs.

37. The non-transitory computer readable medium of any one of clauses 31-36, wherein performing the plurality of process simulations comprises using any of a resist model, lithography model, etching model, or scanning model.

38. The non-transitory computer readable medium of any one of clauses 31-37, wherein the results of the performed process simulations comprise dimensions of features on the sample that correspond to the first plurality of resist pattern designs.

39. The non-transitory computer readable medium of clause 38, wherein the set of instructions that is executable by the at least one processor of the computing device to cause the computing device to further perform: identifying the hotspot in a feature where the dimension of the feature is below a threshold.

40. The non-transitory computer readable medium of any one of clauses 31-39, wherein the hotspot comprises an area with a higher likelihood of a defect being present in a feature on the sample that corresponds to any of the first plurality of resist pattern designs.

41. The non-transitory computer readable medium of any one of clauses 31-40, wherein determining focus-related characteristics that correspond to the plurality of candidate resist pattern designs comprises generating simulated scanning electron microscope (SEM) images of features on the sample that correspond to the plurality of candidate resist pattern designs.

42. The non-transitory computer readable medium of clause 41, the set of instructions that is executable by the at least one processor of the computing device to cause the computing device to further perform: receiving image parameter variations to be used in a plurality of simulations that simulate effects of the image parameter variations, and wherein the simulated SEM images depict the effects of the image parameter variations on the features on the sample that correspond to the plurality of candidate resist pattern designs.

43. The non-transitory computer readable medium of clause 42, wherein the image parameter variations comprise any of data defining a plurality of focus of electron beam adjustments that correspond to the plurality of candidate resist pattern designs, a shift in image-related measurements, or a parameter used by a photolithography system when determining an exposure setting for a sample that is to include features that correspond to the plurality of candidate resist pattern designs.

44. The non-transitory computer readable medium of any one of clauses 31-43, wherein the determining focus-related characteristics comprise any of resist pattern density, number of layout structures in a resist pattern design, a ratio of number of acceptable layout structures to number of unacceptable layout structures, a sidewall angle that corresponds to a resist pattern design, a ratio of number of acceptable sidewall angles to number of unacceptable sidewall angles, or a charging effect.

45. The non-transitory computer readable medium of any one of clauses 31-44, wherein determining the plurality of LFPs based on the determined focus-related characteristics comprises: determining locations on the sample that correspond to the plurality of candidate resist pattern designs and that comprise higher sensitivities to adjustments in focus of electron beams on the locations; and selecting a set of the determined locations as the LFPs.

46. The system of any one of clauses 1-15, wherein each of the first plurality of resist pattern designs comprises a layout structure to be developed on a sample.

47. The system of any one of clauses 1-15 or 46, wherein the first plurality of resist pattern designs are stored in a layout file.

48. The method of any one of clauses 16-30, wherein each of the first plurality of resist pattern designs comprises a layout structure to be developed on a sample.

49. The method of any one of clauses 16-30 or 48, wherein the first plurality of resist pattern designs are stored in a layout file.

50. The non-transitory computer readable medium of any one of clauses 31-45, wherein each of the first plurality of resist pattern designs comprises a layout structure to be developed on a sample.

51. The non-transitory computer readable medium of any one of clauses 31-45 or 50, wherein the first plurality of resist pattern designs are stored in a layout file.

52. The system of any one of clauses 1-15 or 46-47, wherein identifying the hotspot comprises identifying a plurality of hotspots.

53. The system of any one of clauses 1-15, 46-47, or 52, wherein the subset is selected such that the subset comprises a limited number of hotspots.

54. The method of any one of clauses 16-30 or 48-49, wherein identifying the hotspot comprises identifying a plurality of hotspots.

55. The method of any one of clauses 16-30, 48-49, or 54, wherein the subset is selected such that the subset comprises a limited number of hotspots.

56. The non-transitory computer readable medium of any one of clauses 31-45 or 50-51, wherein identifying the hotspot comprises identifying a plurality of hotspots.

57. The non-transitory computer readable medium of any one of clauses 31-45, 50-51, or 56, wherein the subset is selected such that the subset comprises a limited number of hotspots.

58. The system of any one of clauses 1-15, 46-47, or 52-53, wherein the resist pattern design in which the hotspot is identified comprises a plurality of resist pattern designs.

59. The method of any one of clauses 16-30, 48-49, or 54-55, wherein:

identifying the hotspot that corresponds to the resist pattern design comprises identifying a plurality of hotspots that correspond to the resist pattern design, and identifying the plurality of hotspots that correspond to the resist pattern design comprises identifying the plurality of hotspots that correspond to a plurality of resist pattern designs.

60. The system of clause 10, wherein the hotspot comprising an area with a higher likelihood of a defect being present in a feature includes the hotspot comprising an area where the likelihood of a defect being present in a feature is above a threshold value.

It will be appreciated that the embodiments of the present disclosure are not limited to the exact construction that has been described above and illustrated in the accompanying drawings, and that various modifications and changes may be made without departing from the scope thereof.

The invention claimed is:

1. A system for determining local focus points (LFPs) on a sample, the system comprising:
a controller including circuitry configured to cause the system to perform:
selecting a first plurality of resist pattern designs;
performing a plurality of process simulations using the first plurality of resist pattern designs;
identifying a hotspot that corresponds to a resist pattern design based on results of the performed process simulations;
determining focus-related characteristics that correspond to a plurality of candidate resist pattern designs,
wherein the plurality of candidate resist pattern designs is a subset of the first plurality of resist pattern designs and the subset is selected based on the identified hotspot; and
determining locations of a plurality of LFPs based on the determined focus-related characteristics.

2. The system of claim 1, wherein selecting the plurality of resist pattern designs comprises:
analyzing a second plurality of resist pattern designs;
grouping the second plurality of resist pattern designs by pattern types; and
sampling a resist pattern design from each group of the second plurality of resist pattern designs, wherein the selection of the first plurality of resist pattern designs is based on the sampled resist pattern designs.

3. The system of claim 1, wherein performing the plurality of process simulations comprises generating contour images based on the first plurality of resist pattern designs.

4. The system of claim 3, wherein the circuitry is further configured to cause the system to perform:
receiving a set of process variations, wherein the plurality of process simulations are based on the received set of process variations, and
wherein the contour images depict effects of the set of process variations on features on the sample that correspond to the first plurality of resist pattern designs.

5. The system of claim 4, wherein the set of process variations comprise any of data defining a plurality of focus of light adjustments that correspond to the first plurality of resist pattern designs or data defining a plurality of light intensity adjustments that correspond to the first plurality of resist pattern designs.

6. The system of claim 1, wherein performing the plurality of process simulations comprises using any of a resist model, lithography model, etching model, or scanning model.

7. The system of claim 1, wherein the results of the performed process simulations comprise dimensions of features on the sample that correspond to the first plurality of resist pattern designs.

8. The system of claim 7, wherein the circuitry is further configured to cause the system to perform:

identifying the hotspot in a feature where the dimension of the feature is below a threshold.

9. The system of claim 1, wherein the hotspot comprises an area with a higher likelihood of a defect being present in a feature on the sample that corresponds to any of the first plurality of resist pattern designs.

10. The system of claim 1, wherein determining focus-related characteristics that correspond to the plurality of candidate resist pattern designs comprises generating simulated scanning electron microscope (SEM) images of features on the sample that correspond to the plurality of candidate resist pattern designs.

11. The system of claim 10, wherein the circuitry is further configured to cause the system to perform:

receiving image parameter variations to be used in a plurality of simulations that simulate effects of the image parameter variations, and wherein the simulated SEM images depict the effects of the image parameter variations on the features on the sample that correspond to the plurality of candidate resist pattern designs.

12. The system of claim 11, wherein the image parameter variations comprise any of data defining a plurality of focus of electron beam adjustments that correspond to the plurality of candidate resist pattern designs, a shift in image-related measurements, or a parameter used by a photolithography system when determining an exposure setting for a sample that is to include features that correspond to the plurality of candidate resist pattern designs.

13. The system of claim 1, wherein the determined focus-related characteristics comprise any of resist pattern density, number of layout structures in a resist pattern design, a ratio of number of acceptable layout structures to number of unacceptable layout structures, a sidewall angle that corresponds to a resist pattern design, a ratio of number of acceptable sidewall angles to number of unacceptable sidewall angles, or a charging effect.

14. The system of claim 1, wherein determining the plurality of LFPs based on the determined focus-related characteristics comprises:

determining locations on the sample that correspond to the plurality of candidate resist pattern designs and that comprise higher sensitivities to adjustments in focus of electron beams on the locations; and selecting a set of the determined locations as the LFPs.

15. A non-transitory computer readable medium that stores a set of instructions that is executable by at least one processor of a computing device to cause the computing device to perform a method for determining local focus points (LFPs) on a sample, the method comprising:

selecting a first plurality of resist pattern designs;

performing a plurality of process simulations using the first plurality of resist pattern designs;

identifying a hotspot that corresponds to a resist pattern design based on results of the performed process simulations;

determining focus-related characteristics that correspond to a plurality of candidate resist pattern designs, wherein the plurality of candidate resist pattern designs is a subset of the first plurality of resist pattern designs and the subset is selected based on the identified hotspot; and determining locations of a plurality of LFPs based on the generated focus-related characteristics.

16. A method for determining local focus points (LFPs) on a sample, the method comprising:

selecting a first plurality of resist pattern designs; performing a plurality of process simulations using the first plurality of resist pattern designs; identifying a hotspot that corresponds to a resist pattern design based on results of the performed process simulations;

determining focus-related characteristics that correspond to a plurality of candidate resist pattern designs, wherein the plurality of candidate resist pattern designs is a subset of the first plurality of resist pattern designs and the subset is selected based on the identified hotspot; and determining locations of a plurality of LFPs based on the generated focus-related characteristics.

17. The method of claim 16, wherein selecting the plurality of resist pattern designs comprises: analyzing a second plurality of resist pattern designs; grouping the second plurality of resist pattern designs by pattern types; and sampling a resist pattern design from each group of the second plurality of resist pattern designs, wherein the selection of the first plurality of resist pattern designs is based on the sampled resist pattern designs.

18. The method of claim 17, wherein each of the pattern types comprises a shape type of a resist pattern design.

19. The method of claim 16, wherein performing the plurality of process simulations comprises generating contour images based on the first plurality of resist pattern designs.

20. The method of claim 19, further comprising:

receiving a set of process variations, wherein the plurality of process simulations are based on the received set of process variations, and wherein the contour images depict effects of the set of process variations on features on the sample that correspond to the first plurality of resist pattern designs.

* * * * *